3,720,656
ANAEROBIC SEALANT COMPOSITIONS
Kazuo Manaka, Broadview, Ill., assignor to Broadview
Chemical Corporation, Broadview, Ill.
No Drawing. Filed May 10, 1971, Ser. No. 142,063
Int. Cl. C08f 3/64, 3/66, 15/18
U.S. Cl. 260—89.5 N                 23 Claims

ABSTRACT OF THE DISCLOSURE

Anaerobic sealant compositions are prepared with monomers of the general formula:

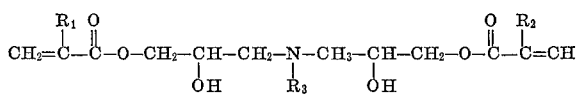

wherein $R_1$ and $R_2$ are selected from the group consisting of hydrogen and lower alkyl and $R_3$ is selected from the group consisting of lower alkyl, lower hydroxyalkyl, cyano, and lower cyanoalkyl. These monomers are reacted with a vinyl organic acid to prepare the amine salt, and are combined with a suitable initiator, inhibitor, and accelerator to prepare an anaerobic sealant.

---

The present invention relates to anaerobic sealant compositions, and more specifically to an improved anaerobic sealant composition based on novel monomers.

The term "anaerobic sealant" refers to compositions that have the characteristic of long shelf life in the presence of air together with the ability to polymerize when confined between two surfaces in the absence of air. In preparing such compositions, it is important to achieve a balance between stability or shelf life in the presence of air and the ability to cure rapidly and form a bond of high strength when air is excluded. In addition, individual anaerobic sealant compositions must be tailored to specific jobs. For example, in some jobs high viscosity is required in order that the sealant will not run off of the parts to be sealed before curing occurs. In some applications, the highest possible strength is desired, while in other applications it is desirable to have low strength so that the seal can be broken easily. Typical applications of anaerobic sealants are the sealing of nuts and bolts, the mounting of bearings, the sealing of hydraulic parts, etc. Anaerobic sealants often provide a low-cost alternative to mechanical fastening means such as lock-washers.

The anaerobic sealants of the present invention are based upon the use of monomers of the general class described in my copending application, Ser. No. 860,786, filed Sept. 24, 1969, now U.S. Pat. No. 3,678,063. The anaerobic sealants of the present invention comprise five basic components: (1) a monomer; (2) at least one equivalent of a vinyl organic acid for each equivalent of the monomer; (3) an initiator; (4) an inhibitor; and (5) an accelerator. The vinyl organic acid could be considered part of the monomer, rather than a separate component, since it forms an amine salt with the monomers utilized in the present invention.

The monomers used in making the anaerobic sealant of the present invention are characterized by the following general formula:

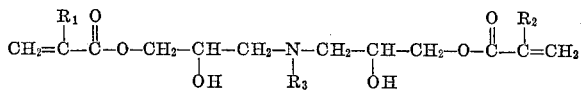

wherein $R_1$ and $R_2$ are selected from the group consisting of hydrogen and lower alkyl and $R_3$ is selected from the group consisting of lower alkyl, lower hydroxyalkyl, cyano, and lower cyanoalkyl.

As used herein, the term "lower alkyl" refers to alkyl radicals having from 1 up to about 6 carbon atoms. An advantage of the monomers described herein is the presence of hydroxyl groups, which produce a high degree of polarity. This polarity lends to the production of exceptionally high strength when used in the bonding of metals.

Polymerization initiators that may be employed in the compositions of the present invention are t-butyl perbenzoate, t-butyl peracetate, and di-t-butyl diperphthalate. The initiator must be present in an amount sufficient to initiate the polymerization of the monomer between two surfaces upon the exclusion of air.

Because the monomers of the present invention are relatively easily polymerized, a highly efficient inhibitor must be employed. It has been found that the trihydroxybenzenes form suitable inhibitors, and these must be present in an amount sufficient to prevent gelling of the composition for at least ten days at 120° F. in the presence of air.

Finally, the anaerobic sealants of the present invention contain an accelerator selected from the group consisting of benzhydrazide and N-aminorhodanine. This accelerator should be present in an amount sufficient to produce a "finger-tight time" of less than one hour. The "finger-tight time" is determined by placing the anaerobic sealant composition between a steel nut and bolt and measuring the amount of time required for the sealant to polymerize sufficiently that the nut cannot be rotated by hand.

By balancing the proportions of the various components of the sealant system, a variety of characteristics, of strength, cure time, and viscosity can be obtained. It is thus possible to formulate a complete line of sealants having varying characteristics.

In addition to the foregoing basic components of the sealant compositions, in accordance with the present invention, a number of additional components, referred to herein as "adjusters," may be employed to prodce the desired characteristics of strength and viscosity.

The overall stability of the composition may be improved while at the same time reducing the bond strength, by the use of an adjuster-stabilizer selected from the group consisting of esters prepared by reacting acrylic or lower alkyl acrylic acids with lower alkanols. Examples of such stabilizers include methyl methacrylate, isobutyl methacrylate, and 2-ethylhexyl methacrylate, the latter being particularly preferred.

If it is desired to increase the viscosity of the composition, a viscosity-increasing adjuster may also be employed. Particularly suitable viscosity-increasing adjusters have been found to be the dimeric and trimeric aliphatic organic acids having from 35 to 54 carbon atoms. By balancing the proportion of dimeric and trimeric acid, the viscosity increase effect can be controlled. Suitable dimeric and trimeric acids are sold by Emery Industries, Inc., Cincinnati, Ohio, under the trade name "Empol Dimer and Trimer Acids."

If a very large increase in viscosity is desired, a polymeric viscosity-increasing adjuster may be employed. Examples of such polymeric viscosity-increasing adjusters are the conventional organic thickening agents such as polyvinyl acetate and polymethyl methacrylate. A suitable polyvinyl acetate is sold commercially in various molecular weights by the Monsanto Company, St. Louis, Mo., under the trade name "Gelva." A suitable polymethyl methacrylate is sold by the Rohm & Haas Company, Philadelphia, Pa., under the trade name "Acryloid K-120N." These polymeric viscosity-increasing adjusters must be used with care, since they may have an adverse effect on the stability of the overall composition.

Another group of adjusters that may be employed in the composition of the present invention is the lower ($C_1$ to $C_6$) alkanols, of which anhydrous ethanol is preferred. These lower alkanols dilute and weaken the compositions while maintaining a low viscosity.

Surprisingly, it has also been discovered that the finger-tight time of the anaerobic sealant compositions of the present invention may be significantly reduced, while at the same time achieving a very high bond strength, by the addition of a small amount of water to the compositions. As a general matter, the amount of water employed should not exceed about ten percent of the weight of the monomer plus the vinyl organic acid employed in the composition.

Preferred monomers for use in the compositions of this invention are derivatives of lower alkyl amines, i.e., where $R_3$ is lower alkyl.

A particularly preferred monomer for use in compositions made in accordance with the present invention is prepared by the reaction of one mole of isopropyl amine with two moles of glycidyl methacrylate, which produces a monomer according to the following reaction:

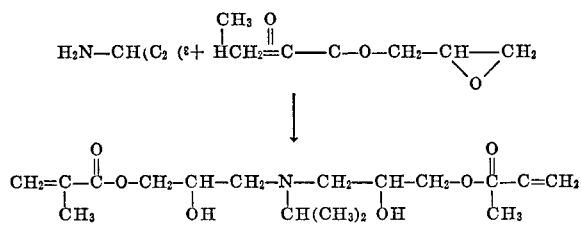

The amount of monomer employed in the anaerobic sealants of the present invention, together with the amount of other components, depends upon the characteristics desired in the ultimate composition. However, as a general matter, compositions made in accordance with the present invention should contain from about 5% to about 80% monomer, and preferably up to about 45% monomer, based upon the overall weight of the composition.

The vinyl organic acid should be present in an amount equal to at least one equivalent of the acid for each equivalent of the monomer, in order to form an amine salt. Because at least a portion of the vinyl organic acid reacts with the monomer to form an amine salt, the acid might be considered part of the monomer itself. However, in the discussion of the present invention, the monomer and the vinyl organic acid are treated as separate components. The preferred vinyl organic acids are acrylic acid and the lower alkyl acrylic acids. A particularly preferred vinyl organic acid is methacrylic acid, which reacts with the preferred monomer to form amine salt as follows:

It is important to employ the proper initiator in conjunction with the above-described monomers in order to produce sealants that are stable yet capable of forming a strong bond when excluded from air. The organic hydroperoxides have, as a class been found to be too active, and produce unstable compositions. On the other hand, a number of peroxides have been found insufficiently active to produce curing. The compositions that have been found suitable are t-butyl peracetate, di-t-butyl diperphthalate, and t-butyl perbenzoate, of which t-butyl perbenzoate is the most preferred. As previously stated, the amount of initiator employed should be sufficient to initiate polymerization of the monomer between two surfaces when air is excluded. However, the initiator should not be present in such a large amount that it produces instability. While the optimum amount will vary with individual compositions, as a general matter the initiator should be present in an amount of about 1 to 3%, based on the weight of the overall sealant composition. It may also be generally stated that, in order to produce adequate curing, the amount of initiator must be increased as the proportion of monomer in the composition decreases.

In order to maintain shelf stability in the compositions of the present invention, it is necessary to employ an inhibitor. Because the monomers employed in the present invention are highly reactive, a highly reactive inhibitor is required. Thus, many conventional inhibitors, such as hydroquinone, p-methoxyphenol, and quinones, are unsuitable. It has been found that suitable inhibitors for use in the present invention are the trihydroxybenzenes, the most preferred inhibitor being pyrogallol. The inhibitor should be present in an amount sufficient to prevent gelling of the composition when placed in an oven at 120° F. for ten days in the presence of air. Such a test represents an "accelerated aging" test, and gives an indication of the shelf life of the composition. This accelerated aging test for anaerobic sealants is approved in U.S. military specifications MIL–S–22473D and MIL–R–46082A(MR). Again, the amount of inhibitor required depends upon the proportion of other components present in the composition. Generally, the amount of inhibitor required decreases as the amount of monomer decreases, although the decrease in inhibitor is not proportionately as great as the decrease in monomer. As a general matter, based on the weight of the overall composition, about 0.1 to 1.0%, and preferably about 0.2 to 0.5%, inhibitor is required in order to produce compositions of adequate stability.

It is also essential to include an accelerator in the compositions of the present invention in order to produce

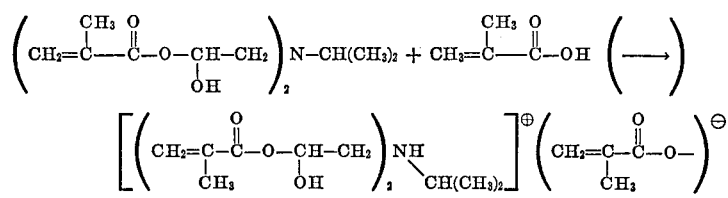

It is preferred that an excess amount of vinyl organic acid be present. The amount of excess vinyl organic acid is not critical, although in the preferred embodiment at least about four moles of vinyl organic acid are employed for each mole of monomer. When methacrylic acid is employed with the preferred monomer, this result is achieved by adding an amount of methacrylic acid which is equal to the weight of the monomer. In some instances, however, it has been found that even larger excesses of methacrylic acid are desirable in order to lend stability to the composition, and six or more moles of vinyl organic acid for each mole of monomer may be used with success.

acceptable rapid curing. For the purposes of the present invention, acceptable curing speed is that which produces a "finger-tight time" of less than one hour. Experimentation has demonstrated that benzhydrazide and N-aminorhodanine are suitable accelerators, N-aminorhodanine being preferred. While requirements may vary depending upon the other components of the compositions, in general the accelerator should be present in an amount of about 0.05 to 0.2%, and preferably about 0.10 to 0.15%, based on the weight of the composition.

As previously discussed, a number of components, referred to herein as "adjusters," may be employed to control the characteristics of viscosity, strength, and curing speed. Generally, the amount of adjuster employed is less critical than the amount of the basic components, since the adjusters have a relatively minor effect on stability and ability to cure. However, certain general statements may be made concerning the quantities of adjusters that are preferably employed.

As to the adjuster-stabilizers, i.e., the esters made by reacting acrylic or lower alkyl acrylic acids with lower alkanols, the amount employed may vary from zero up to as much as 60% of the overall composition.

Another group of adjusters which is particularly effective in increasing the viscosity of the compositions, but which has very little if any stabilizing effect, are the dimeric and trimeric aliphatic organic acids having from 36 to 54 carbon atoms. These acids may also be employed in amounts of up to about 60% based on the weight of the overall composition.

If extremely viscous compositions are desired, as previously discussed, relatively small amounts of conventional polymeric viscosity increaser such as polymethyl methacrylate and polyvinyl acetate can be employed. These conventional viscosity increasers can be employed in amounts of as much as 10%, but preferably should not be present in an amount of over 5%, based on the weight of the composition. When amounts above these ranges are employed, deleterious effects on the stability of the overall composition may be encountered.

Another group of adjusters, which effectively dilutes and decreases the strength of the compositions without increasing viscosity, is the lower alkanols, of which ethanol is particularly preferred. Again, the amount employed is not critical, and these lower alkanols may be employed in an amount of as much as 25%, based on the weight of the overall composition.

The following examples are intended to illustrate the present invention, and should not be construed as limitative, the scope of the invention being determined by the appended claims.

EXAMPLE I

Monomer for use in preparing the anaerobic sealants of the present invention was prepared in a glass reactor having a water jacket and equipped with a stuffing box through which a glass propeller shaft having a glass stirring propeller on the end is passed. The shaft was connected to a motor outside the reactor. The reactor was equipped with a well for a thermometer and a filling opening. A glass container was positioned above the reactor, and was connected to it by means of plastic tubing having a plastic valve to regulate the flow of liquid from the glass container to the reactor. Since the system was closed, a pressure-equalizing line was connected between the glass container and the reactor in order to equalize pressures and permit liquid to flow from the glass container.

72.15 pounds glycidyl methacrylate were placed into the reactor, and 15 pounds of isopropyl amine were placed into the glass container. The isopropyl amine was fed into the reactor over a period of one hour, during which the contents were gently stirred. Cold water was passed through the water jacket at a rate sufficient to hold the temperature in the reactor below 30° C. The stirring and cooling were continued for 24 hours, and the contents were then removed from the reactor and placed in a plastic bottle. The bottle was placed in a water bath, which was held below 30° C. for four days. The bottles were then removed from the water bath and allowed to stand at room temperature for nine days. The product was a viscous monomer having a very light amber color.

EXAMPLE II

Example I was repeated, except that 18.6 pounds of n-butyl amine were substituted for the isopropyl amine. The reaction continued in a similar manner, and the n-butyl amine was somewhat easier to handle than the isopropyl amine because of its decreased volatility. However, the n-butyl amine has a higher cost than the isopropyl amine, and is therefore less desirable from an economic standpoint.

EXAMPLE III

Example I was repeated, except that 10.7 pounds of cyanamide were substituted for the isopropyl amine. Because cyanamide is a solid, it was added in small portions to the reactor through the filling opening over a period of one hour. The reaction proceeded in a similar manner to the reaction discused in Example I, and produced a product having the following structure:

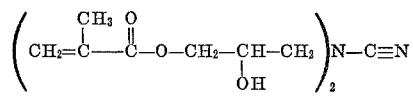

EXAMPLE IV

Forty-two grams of a monomer made in accordance with Example I were placed in a four-ounce polyethylene bottle. 0.8 gram of isopropyl amine was slowly added to the monomer, and the monomer was shaken for about eight hours on a mechanical shaker, and allowed to stand overnight. The bottle was then placed in an oven at 180° F. for one hour, and then cooled to room temperature by immersing the bottle in cold water. The purpose of the addition of this small amount of isopropyl amine is to remove any residual glycidyl methacrylate, as the latter is highly toxic. An increase in the viscosity of the monomer was also noted. Forty-two grams of methacrylate acid were added to the monomer, and the mixture was shaken briefly to mix the two components and to form the amine salt. This methacrylic acid was present in a ratio of about 4 moles of methacrylic acid for each mole of monomer.

Sixteen grams of denatured anhydrous ethanol were next added, and the bottle was shaken briefly. The ethanol is marketed by the Enjay Corporation under the trade name "Anhydrous Jaysol." 0.5 gram pyrogallol and 0.13 gram N-aminorhodanine were then added to the mixture, and the mixture was shaken for one hour on a mechanical shaker to dissolve these materials. Finally, 1.5 grams t-butyl perbenzoate were added, and the mixture was shaken again for one hour to be certain that all of the components were dissolved.

The composition was found to produce a "finger tight" time of 20 minutes, and a nut and bolt on which the composition was used produced a breaking torque (strength) of 260 inch-pounds after being allowed to stand for 24 hours.

The composition showed no evidence of gelling when placed in an oven at 82° C. for one hour, and also when placed in an oven at 120° F. for ten days.

EXAMPLE V 32.5 grams of monomer prepared in accordance with Example I were placed in a four-ounce polyethylene bottle, and 0.65 gram isopropyl amine was added. The mixture was shaken for eight hours, allowed to stand overnight, heated to 180° F., and cooled as in the preceding example. Again, an increase in the viscosity of the monomer was noted. 32.5 grams of methacrylic acid were next added to the monomer, and the mixture was shaken briefly.

35 grams ethylhexyl methacrylate were next added, and the mixture was briefly shaken. 0.4 gram pyrogallol and 0.13 gram N-aminorhodanine were then added, and the mixture was shaken for one hour on a mechanical shaker to dissolve these components. Finally, 1.8 grams t-butyl perbenzoate were added, and the mixture was again shaken.

The composition was tested and found to produce a finger-tight time of 15 minutes, and a 24-hour strength of 140 inch pounds. The viscosity of the composition was 21 cp., as measured at room temperature on a Brookfield Viscometer. The composition was stable in the presence of air for one hour at 82° C., and for ten days at 120° F.

EXAMPLE VI

Thirty-four grams of monomer prepared in accordance with Example I were placed in a four-ounce polyethylene bottle and mixed with 0.68 gram isopropyl amine. The mixture was shaken for eight hours, allowed to stand overnight, heated to 180° F., and cooled as in Example IV. This treatment produced a marked increase in viscosity. Thirty-four grams of methacrylic acid were added, and the mixture was shaken briefly.

Sixteen grams ethylhexyl methacrylate was added to the monomer, and the mixture was shaken. 0.4 gram pyrogallol and 0.13 gram N-aminorhodanine were then added and the mixture was shaken for one hour on a mechanical shaker. In order to increase the viscosity of the composition, 16 grams of "Empol Dimer Acid 1024" were added. This composition is marketed by Emery Industries, Inc., Cincinnati, Ohio. It comprises about 75% $C_{36}$ aliphatic dibasic acid and 25% $C_{54}$ aliphatic tribasic acid. The dimeric acid has an approximate molecular weight of 565 and the trimeric acid has an approximate molecular weight of 850. The mixture was shaken for one-half hour on the mechanical shaker, and showed a marked increase in viscosity. Finally, 1.8 gram t-butyl perbenzoate were added, and the mixture was shaken again.

The composition produced a finger-tight time of 15 minutes and a 24 hour strength of 165 inch-pounds. The viscosity of the composition was 170 cp. at room temperature. The composition was stable for one hour at 82° C. and for ten days at 120° F.

EXAMPLE VII

Sixteen grams of the monomer prepared in accordance with Example I were placed in a four-ounce polyethylene bottle and mixed with 0.16 gram isopropyl amine. The mixture was shaken for eight hours, allowed to stand overnight, heated to 180° F., and cooled as in Example IV. An increase in the viscosity of the monomers was noted. The monomer was then mixed with 16 grams methacrylic acid and shaken briefly.

Eight grams of 2-ethylhexyl methacrylate were next added, and the composition was briefly shaken. 0.5 gram pyrogallol and 0.13 gram N-aminorhodanine were added and the mixture was shaken for one-half hour on a mechanical shaker. Ten grams of Empol Dimer acid 1024, described in the preceding example, were added. 50 grams of Empol Dimer acid 1041 were also added, and the mixture was shaken for one-half hour. Empol Dimer acid 1041 is similar to dimer acid 1024, except that it has a higher proportion of trimeric acid, and is therefore more viscous. Finally, 2.2 grams t-butyl perbenzoate were added, and the mixture was shaken again for one-half hour.

The composition yielded a finger tight time of 25 minutes and a 24 hour torque of 40 inch pounds. The viscosity of the composition was 1300 cp. The composition was stable for one hour at 82° C. and for 10 days at 120° F.

EXAMPLE VIII

Five grams of monomer were placed in a four-ounce polyethylene bottle and mixed with 0.1 gram of isopropyl amine. The mixture was shaken for eight hours, allowed to stand overnight, and then heated to 180° F. and cooled as in Example IV. An increase in the viscosity of the monomer was noted. This monomer was then mixed with 5 grams methacrylic acid and shaken briefly.

Thirty-five grams of ethylhexyl methacrylate were mixed with the monomer and methacrylic acid, and the mixture was shaken briefly. 0.2 gram pyrogallol and 0.13 gram N-aminorhodanine were then added, and the mixture was shaken for one-half hour. 55 grams Empol Dimer Acid 1024 were added, and the mixture was again shaken for one-half hour. Finally, 2.8 grams t-butyl perbenzoate were added to complete the composition.

The composition yielded a finger-tight time of 35 minutes, and a 24 hour strength of 15 inch-pounds. Because of the small amount of monomer, this composition is designed to have a low strength in order to form a seal that can readily be broken. This viscosity of the composition was 120 cps. and the composition proved stable for one hour at 82° C. and for ten days at 120° F.

EXAMPLE IX

Forty grams of the monomer prepared in accordance with Example I were placed in a four-ounce polyethylene bottle, and were mixed with 0.4 gram isopropyl amine. The mixture was shaken for eight hours, allowed to stand overnight, heated to 180° F., and cooled as in Example IV. 4.5 grams polyvinyl acetate, having an average molecular weight of 500,000 and 0.5 gram polyvinyl acetate having an average molecular weight of 1,500,000 were then added to forty grams of methacrylic acid, and this mixture was shaken for three hours on a mechanical shaker. The polyvinyl acetate is sold by the Monsanto Co., St. Louis, Mo., under the tradenames "Gelva V–100" and "Gelva V–800" for the lower and higher molecular weight materials, respectively.

The monomer mixed with isopropyl amine was then added to this polyvinyl acetate solution of methacrylic acid, and the mixture was shaken briefly. Twelve grams of "Anhydrous Jaysol" were added, the mixture was shaken briefly, and 0.5 gram pyrogallol plus 0.13 gram N-aminorhodanine were added, and the mixture was shaken for one-half hour. Finally, 1.8 grams of t-butyl perbenzoate and 3.0 grams of water were added, and the composition was given a final shaking for one-half hour. The composition produced a finger-tight time of seven minutes, had a strength after 24 hours of 170 inch-pounds, and had a viscosity of 1070 cp. The composition was stable for one hour at 82° C. and for ten days at 120° F.

EXAMPLE X

Forty grams of monomer prepared in accordance with Example I were placed in a four-ounce polyethylene bottle, were mixed with 1.2 grams isopropyl amine and were shaken, heated, and cooled as in Example IV. Fifty-five grams of methacrylic acid were then added, and the mixture was shaken briefly. This amount of methacrylic acid is equivalent to about 5.5 moles of acid for each mole of monomer.

0.5 gram pyrogallol plus 0.13 gram N-aminorhodanine were added and the mixture was shaken for one-half hour. 0.5 gram of water plus 1.5 grams t-butyl perbenzoate were then added, and the mixture was again shaken for one-half hour.

This composition produced an extremely fast finger-tight time of five minutes together with an exceptionally high 24 hour strength of 220 inch-pounds. The viscosity of the composition was 150 cp. Despite this high strength, and rapid cure, the composition was stable for one hour at 82° C. and for ten days at 120° F.

This composition was further tested for static shear strength in accordance with the test set forth in military specification, MIL–R–46082A(M.R.), Section 4.6.2.1.2., method A. In accordance with this test, the composition produced an exceptionally high static shear strength of 3310 p.s.i. after 1¼ hours. After 24 hours, the shear strength was 3348 p.s.i., showing that the curing of the composition was virtually complete after 1¼ hours.

EXAMPLE XI 37.5 grams of monomer prepared in accordance with Example I were placed in a four-ounce polyethylene bottle and were mixed with 37.5 grams of methacrylic acid and shaken briefly. 0.5 gram of pyrogallol and 0.13 gram of N-aminorhodanine were added to the monomer and methacrylic acid, and the mixture was shaken for one-half hour to dissolve the pyrogallol and N-aminorhodanine. 3.5 grams of Acryloid K–120 N, a commercial polymethyl methacrylate manufactured by the Rohm & Haas Company, Philadelphia, Pa., were added, and the mixture was shaken for three hours. The addition of the Acryloid caused a great increase in viscosity.

21.2 grams of ethanol were then added, the mixture was briefly shaken, 2.2 grams t-butyl perbenzoate were added, and the composition was shaken for one-half hour.

The composition was tested, and gave a finger-tight time of 22 minutes. The strength after 24 hours was 240 inch-pounds, and the viscosity of the composition was 1950 cp. The composition was stable both for one hour at 82° C. and for ten days at 120° F.

Obviously, many modifications and variations of the invention as hereinbefore set forth will occur to those skilled in the art, and it is intended to cover in the appended claims all such modifications and variations as fall within the true spirit and scope of the invention.

I claim:

1. An anaerobic sealant composition characterized by extended shelf life in the presence of air and by the ability to polymerize when confined between two surfaces comprising:

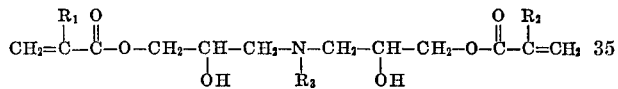

a monomer characterized by the formula:
wherein $R_1$ and $R_2$ are selected from the group consisting of hydrogen and lower alkyl and $R_3$ is selected from the group consisting of lower alkyl, lower hydroxyalkyl, cyano, and lower cyanoalkyl;
at least one equivalent of an acid for each equivalent of said monomer; said acid being selected from the group consisting of acrylic acid and lower alkyl acrylic acids;
an initiator selected from the group consisting of t-butyl perbenzoate, t-butyl peracetate and di-t-butyl diperphthalate, said initiator being present in an amount sufficient to initiate the polymerization of said monomer between two surfaces when air is excluded therefrom;
a trihydroxy benzene inhibitor in an amount sufficient to prevent gelling of said composition for at least ten days at 120° F. in the presence of air; and
an accelerator selected from the group consisting of benzhydrazide and N-aminorhodanine, said accelerator being present in an amount sufficient to produce a finger-tight time of less than one hour.

2. The sealant compositions as defined in claim 1 wherein $R_3$ is lower alkyl, and wherein said vinyl organic acid is selected from the group consisting of acrylic acid and lower alkyl acrylic acids.

3. The sealant compositions as defined in claim 2 wherein said inhibitor is pyrogallol.

4. The sealant compositions as defined in claim 3 wherein said initiator is t-butyl perbenzoate.

5. The sealant compositions as defined in claim 4 wherein said accelerator is N-aminorhodanine.

6. The sealant compositions as defined in claim 1 wherein said composition further comprises a stabilizer selected from the group consisting of esters prepared by the reaction of acrylic and lower alkyl acrylic acids with lower alkanols.

7. The sealant compositions as defined in claim 6 wherein said esters are methacrylic acid esters.

8. The sealant compositions as defined in claim 1 further comprising a viscosity-increasing component.

9. The sealant compositions as defined in claim 8 wherein said viscosity-increasing component is selected from the group consisting of dimeric and trimeric aliphatic organic acids having from 36 to 54 carbon atoms and mixtures thereof.

10. The sealant compositions as defined in claim 1 further comprising water in an amount of up to about 10% based on the weight of said monomer and said vinyl organic acid.

11. The compositions as defined in claim 1 wherein said vinyl organic acid is present in an amount of about 4 moles for each mole of said monomer.

12. An anaerobic sealant composition characterized by extended shelf life in the presence of air and by the ability to polymerize when confined between two surfaces comprising:

a monomer characterized by the formula:

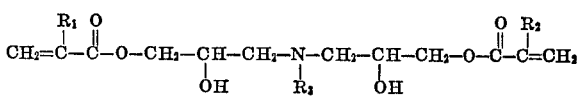

wherein $R_1$ and $R_2$ are selected from the group consisting of hydrogen and lower alkyl and $R_3$ is lower alkyl;
at least one equivalent of an acid for each equivalent of said monomer, said acid being selected from the group consisting of acrylic acid and lower alkyl acrylic acids;
an initiator selected from the group consisting of t-butyl perbenzoate, t-butyl peracetate, and di-t-butyl diperphthalate, said initiator being present in an amount sufficient to initiate the polymerization of said monomer between two surfaces when air is excluded therefrom;
pyrogallol in an amount sufficient to prevent gelling of said composition for at least ten days at 120° F. in the presence of air;
an accelerator selected from the group consisting of benzhydrazide and N-aminorhodanine, said accelerator being present in an amount sufficient to produce a finger-tight time of less than one hour; and
a stabilizer selected from the group consisting of esters prepared by the reaction of acrylic and lower alkyl acrylic acids with lower alkanols.

13. The sealant compositions as defined in claim 12 further comprising a viscosity-increasing component.

14. The sealant compositions as defined in claim 13 wherein said viscosity-increasing component is selected from a group consisting of dimeric and trimeric aliphatic organic acids having from 36 to 54 carbon atoms and mixtures thereof.

15. The sealant compositions as defined in claim 12 further comprising water in an amount up to about 10% based on the weight of said monomer and said acid.

16. An anaerobic sealant composition characterized by extended shelf life in the presence of air and by the ability to polymerize when confined between two surfaces comprising:

a monomer characterized by the formula:

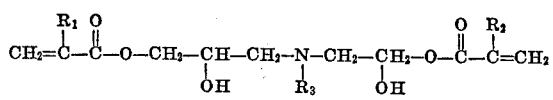

wherein, $R_1$ and $R_2$ are selected from the group consisting of hydrogen and lower alkyl and $R_3$ is lower alkyl;
at least one equivalent of an acid for each equivalent of said monomer, said acid being selected from the group consisting of acrylic acid and lower alkyl acrylic acids;
t-butyl perbenzoate in an amount sufficient to initiate the polymerization of said monomer between two surfaces when air is excluded therefrom;

pyrogallol in an amount sufficient to prevent gelling of said composition for at least ten days at 120° F. in the presence of air;
N-aminorhodanine in an amount sufficient to produce a finger-tight time of less than one hour;
an ester of methacrylic acid and a lower alkanol; and
a viscosity-increasing component selected from the group consisting of dimeric and trimeric aliphatic organic acid having from 36 to 54 carbon atoms and mixtures thereof.

17. The sealant compositions as defined in claim 16 wherein $R_1$ and $R_2$ are methyl and $R_3$ is isopropyl.

18. The sealant compositions as defined in claim 17 wherein said acid is methacrylic acid.

19. An anaerobic sealant composition characterized by extended shelf life in the presence of air and by the ability to polymerize when confined between two surfaces comprising:
a monomer characterized by the formula:

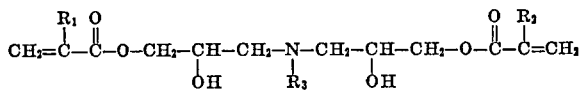

wherein $R_1$ and $R_2$ are selected from the group consisting of hydrogen and lower alkyl and $R_3$ is lower alkyl;
at least one equivalent of an acid for each equivalent of said monomer, said acid being selected from the group consisting of acrylic acid and lower alkyl acrylic acids;
an initiator selected from the group consisting of t-butyl perbenzoate, t-butyl peracetate, and di-t-butyl diperphthalate, said initiator being present in an amount sufficient to initiate the polymerization of said monomer between two surfaces when air is excluded therefrom;
a trihydroxy benzene inhibitor in an amount sufficient to prevent gelling of said composition for at least ten days at 120° F. in the presence of air;
an accelerator selected from the group consisting of benzhydrazide and N-aminorhodanine, said accelerator being present in an amount sufficient to produce a finger-tight time of less than one hour; and
water in an amount of up to about 10% of the weight of said monomer plus said vinyl organic acid.

20. The sealant compositions as defined in claim 19 wherein said inhibitor is pyrogallol.

21 The sealant compositions as defined in claim 20 wherein said initiator is t-butyl perbenzoate.

22. The sealant compositions as defined in claim 21 wherein said accelerator is N-aminorhodanine 23. The sealant composition as defined in claim 22 wherein $R_1$ and $R_2$ arem ethyl and $R_3$ is isopropyl.

References Cited
UNITED STATES PATENTS
3,493,552  2/1970  Rai et al. ........... 260—89.5 N HARRY WONG, Jr., Primary Examiner U.S. Cl. X.R.

117—132; 260—80.81, 85.5 A, 85.5 N, 86.1 N, 88.7 A, 88.7 F, 465,9, 486, 885

UNITED STATES PATENT OFFICE
CERTIFICATE OF CORRECTION

Patent No. 3,720,656     Dated March 13, 1973

Inventor(s) KAZUO MANAKA

It is certified that error appears in the above-identified patent and that said Letters Patent are hereby corrected as shown below:

Column 1, line 15, delete the structural formula and substitute the following formula therefor:

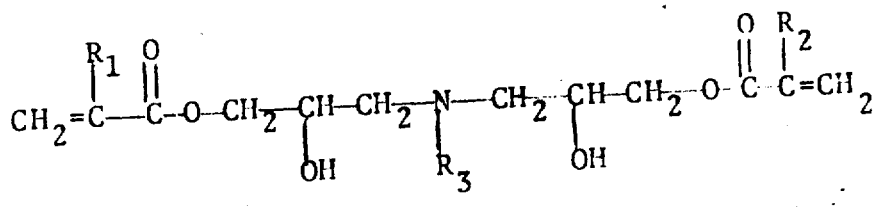

Column 1, line 52, after "1969" delete "now U. S. Pat. No. 3,678,063"

Column 3, line 22, delete the structural formula and substitute the following formula therefor:

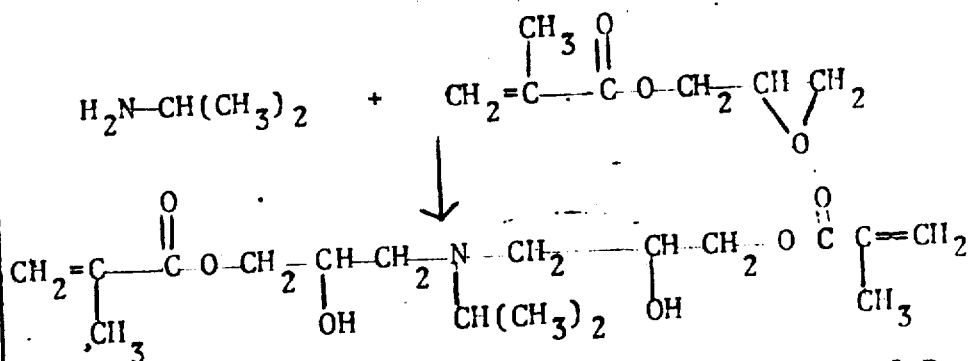

Signed and sealed this 4th day of December 1973.

(SEAL)
Attest:

EDWARD M. FLETCHER, JR.
Attesting Officer

RENE D. TEGTMEYER
Acting Commissioner of Patent

UNITED STATES PATENT OFFICE
CERTIFICATE OF CORRECTION

Patent No. 3,720,656    Dated March 13, 1973

Inventor(s) KAZUO MANAKA

It is certified that error appears in the above-identified patent and that said Letters Patent are hereby corrected as shown below:

Column 1, line 15, delete the structural formula and substitute the following formula therefor:

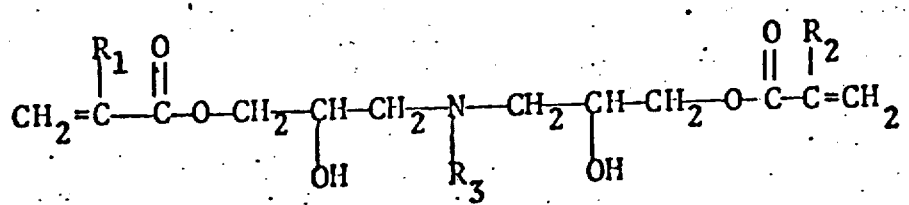

Column 1, line 52, after "1969" delete "now U. S. Pat. No. 3,678,063"

Column 3, line 22, delete the structural formula and substitute the following formula therefor:

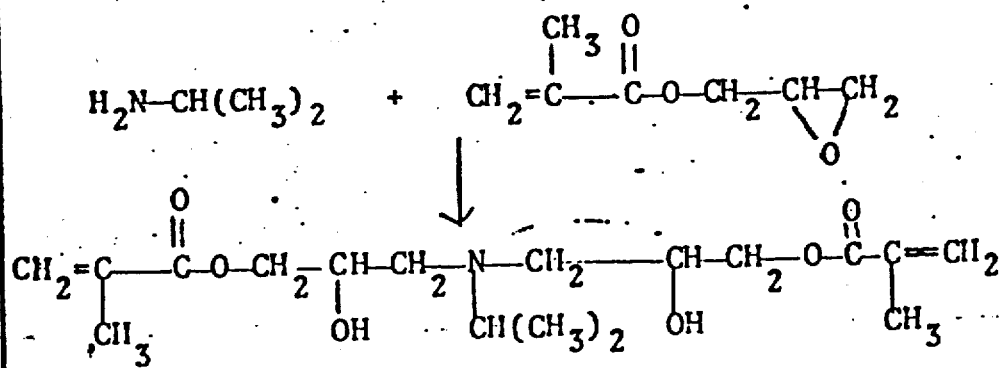

UNITED STATES PATENT OFFICE
CERTIFICATE OF CORRECTION

Patent No. 3,720,656      Dated March 13, 1973

Inventor(s) KAZUO MANAKA

It is certified that error appears in the above-identified patent and that said Letters Patent are hereby corrected as shown below:

Column 1, line 15, delete the structural formula and substitute the following formula therefor:

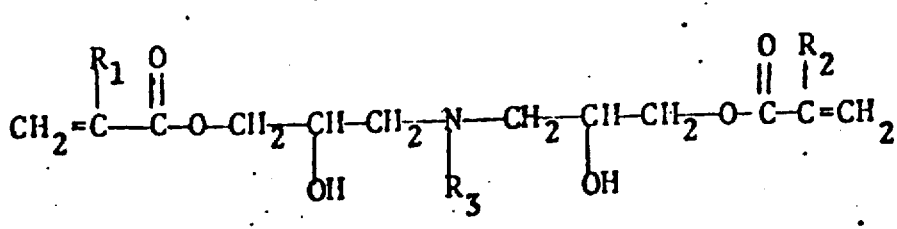

Column 1, line 52, after "1969" delete "now U. S. Pat. No. 3,678,063"

Column 3, line 22, delete the structural formula and substitute the following formula therefor:

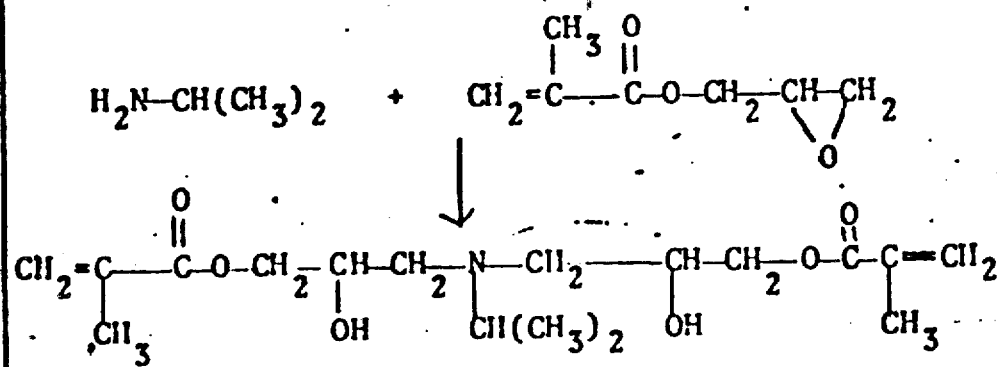

UNITED STATES PATENT OFFICE
CERTIFICATE OF CORRECTION

Patent No. 3,720,656                    Dated March 13, 1973

Inventor(s) KAZUO MANAKA

It is certified that error appears in the above-identified patent and that said Letters Patent are hereby corrected as shown below:

Column 3, after line 51, correct the first line of the reaction to read:

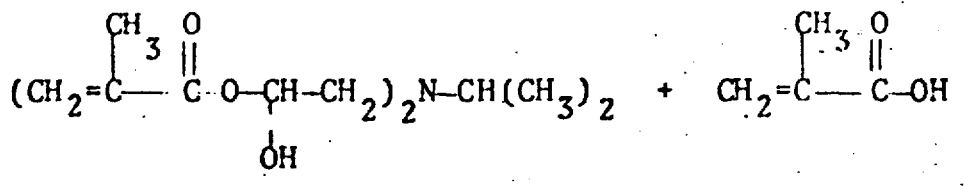

Column 9, line 33, before the formula insert "a monomer characterized by the formula"

Column 9, line 37, after the formula delete "a monomer characterized by the formula".

Column 10, line 62, delete the structural formula and substitute the following formula therefor:

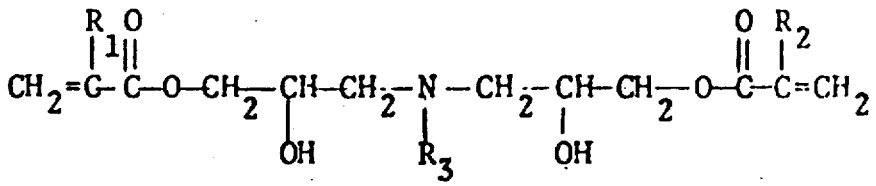

Column 12, line 23, delete "arem ethyl" and substitute therefor --are methyl--.

This certificate supersedes Certificate of Correction issued December 4, 1973.

Signed and sealed this 7th day of May 1974.

(SEAL)
Attest:

EDWARD M. FLETCHER, JR.
Attesting Officer

C. MARSHALL DANN
Commissioner of Patents